US009506587B2

(12) United States Patent
Petit

(10) Patent No.: US 9,506,587 B2
(45) Date of Patent: Nov. 29, 2016

(54) CONNECTOR FOR AN AIRCRAFT FUEL PIPE

(75) Inventor: David Petit, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 171 days.

(21) Appl. No.: 13/002,773

(22) PCT Filed: Jul. 6, 2009

(86) PCT No.: PCT/GB2009/050795
§ 371 (c)(1),
(2), (4) Date: Jan. 6, 2011

(87) PCT Pub. No.: WO2010/004321
PCT Pub. Date: Jan. 14, 2010

(65) Prior Publication Data
US 2011/0115214 A1    May 19, 2011

(30) Foreign Application Priority Data

Jul. 10, 2008 (GB) .................................. 0812562.7

(51) Int. Cl.
| | | |
|---|---|---|
| *F16L 39/04* | (2006.01) | |
| *F16L 27/04* | (2006.01) | |
| *B64D 37/00* | (2006.01) | |
| *B64D 37/20* | (2006.01) | |

(Continued)

(52) U.S. Cl.
CPC .......... *F16L 27/044* (2013.01); *B64D 37/005* (2013.01); *B64D 37/20* (2013.01); *F16L 25/01* (2013.01); *F16L 27/073* (2013.01); *F16L 39/04* (2013.01)

(58) Field of Classification Search
CPC .......... F16L 27/02; F16L 27/04; F16L 27/06; F16L 27/073; F16L 27/125; F16L 39/04
USPC ................................ 285/261, 262, 263, 271
See application file for complete search history.

(56) References Cited

U.S. PATENT DOCUMENTS

| | | | | | |
|---|---|---|---|---|---|
| 2,117,152 | A | * | 5/1938 | Crosti | ........................... 285/263 |
| 2,209,235 | A | | 7/1940 | Nathan | |
| 3,296,361 | A | * | 1/1967 | Markland | ............. H01R 35/02 |
| | | | | | 174/12 R |

(Continued)

FOREIGN PATENT DOCUMENTS

| | | |
|---|---|---|
| DE | 9211967 U1 | 10/1992 |
| DE | 202004014684 U1 | 11/2004 |

(Continued)

OTHER PUBLICATIONS

ISR for PCT/GB2009/050795 mailed Oct. 16, 2009.

(Continued)

*Primary Examiner* — David E Bochna
(74) *Attorney, Agent, or Firm* — Hauptman Ham, LLP

(57) ABSTRACT

A connector for connecting a pipe, such as a fuel pipe, to another fuel pipe or pipe terminal, having a first connector element including a first female sub-element and a concentric second female sub-element, a first seal seat positioned within the first female sub-element, a second seal seat positioned in the concentric second female sub-element, a first seal retained within the first seal seat, a second seal retained the second seal seat, and a second connector element providing a connection for a pipe at one end and connection to the first connector element at a second end.

9 Claims, 6 Drawing Sheets

(51) Int. Cl.
*F16L 25/01* (2006.01)
*F16L 27/073* (2006.01)

(56) References Cited

U.S. PATENT DOCUMENTS

| | | | |
|---|---|---|---|
| 3,486,773 A | 12/1969 | Deplante | |
| 3,943,273 A * | 3/1976 | de Putter | F16L 47/08 285/231 |
| 4,071,268 A * | 1/1978 | Halling | F16L 17/00 285/106 |
| 4,071,269 A * | 1/1978 | Halling | F16L 27/04 285/145.2 |
| 4,553,775 A * | 11/1985 | Halling | 285/55 |
| 4,757,963 A * | 7/1988 | Cole | B64D 15/04 244/134 B |
| 4,850,616 A | 7/1989 | Pava | |
| 5,069,487 A * | 12/1991 | Sheppard | F16L 27/111 285/123.1 |
| 5,106,129 A * | 4/1992 | Camacho | F16L 27/12 277/616 |
| 5,400,984 A * | 3/1995 | Arnold | B64D 15/04 244/134 B |
| 5,772,254 A * | 6/1998 | Felber | F16L 27/06 285/16 |
| 6,099,726 A * | 8/2000 | Gembolis | B01D 29/21 210/243 |
| 6,193,192 B1 * | 2/2001 | Porte | F02C 7/047 244/134 B |
| 6,250,690 B1 * | 6/2001 | Sakai | F16L 27/026 285/145.3 |
| 6,257,625 B1 * | 7/2001 | Kitani | F16L 27/12 285/145.3 |
| 6,585,191 B2 * | 7/2003 | Andre | B64D 15/04 244/134 B |
| 6,709,023 B2 * | 3/2004 | French | F16L 27/06 285/223 |
| 6,854,486 B2 * | 2/2005 | Challender | 138/109 |
| 6,871,882 B2 * | 3/2005 | Challender | F16L 27/06 285/261 |
| 7,503,590 B2 * | 3/2009 | Challender | F16L 39/04 285/261 |
| 7,556,295 B2 * | 7/2009 | Holzheu | A01K 7/027 285/147.1 |
| 7,600,711 B1 * | 10/2009 | Nyhus | B64C 3/385 137/561 A |
| 2005/0012329 A1 | 1/2005 | Brown | |
| 2008/0122221 A1 | 5/2008 | Bridgewater | |

FOREIGN PATENT DOCUMENTS

| | | | |
|---|---|---|---|
| FR | 1129134 A | 1/1957 | |
| FR | 2142224 A | 3/1975 | |
| FR | WO 2007110499 A1 * | 10/2007 | B64D 15/04 |
| GB | 827353 A | 2/1960 | |
| GB | 1301028 A | 12/1972 | |
| GB | 2112482 A | 7/1983 | |
| GB | 2305702 A | 4/1997 | |
| GB | 2446152 A | 8/2008 | |
| WO | 2006/029601 A1 | 3/2006 | |

OTHER PUBLICATIONS

British Search Report for GB0812562.7 dated Apr. 22, 2009.

* cited by examiner

CONNECTOR FOR AN AIRCRAFT FUEL PIPE

RELATED APPLICATIONS

The present application is national phase of International Application Number PCT/GB2009/050795 filed Jul. 6, 2009, and claims priority from, British Application Number 0812562.7 filed Jul. 10, 2008.

FIELD OF INVENTION

The present invention relates to a connector for an aircraft fuel pipe.

BACKGROUND OF THE INVENTION

Fluids such as fuel are transported between storage such as tanks and application sites such as engines using lines or pipes. Such pipes are manufactured in lengths and jointed using pipe connectors. Pipes may also be jointed at their ends at respective storage and application sites using pipe terminal connectors.

One problem with such pipe joints is that they are subject to movement, which may cause wear or leakage and thus such joints require regular inspection and maintenance. Furthermore, the maintenance of such joints may introduce faults. For example, seals within the joints may be replaced incorrectly or may fail to seat correctly when a joint is reassembled.

SUMMARY OF THE INVENTION

An embodiment of the invention provides a connector for a pipe, the connector comprising:
a first connector element comprising a generally cylindrical body member having a central axis and providing a connection for a pipe at one end and a seal seat at the other end for carrying a seal;
a seal located in the seal seat;
a second connector element comprising a hollow generally cylindrical body member having a central axis and providing a connection for a pipe at one end and a spherical bearing surface formed at the other end, the bearing surface being radially disposed about the central axis of the second connector element, the spherical bearing surface being arranged so as to maintain sealing engagement with the seal within a predetermined range of relative rotation between the first and second connector elements in the planes parallel to the central axes.

The bearing surface may be further arranged so as to maintain sealing engagement with the seal within a predetermined range of relative movement between the first and second connector elements along the central axes. The seal may provide a cylindrical sealing surface for the sealing engagement with the bearing surface. The seal may be provided on the interior surface of the cylindrical body member of the second connector element and the bearing surface is provided on the exterior surface of the second cylindrical body member of the second connector element, the bearing surface being curved away from the central axis. The seal may be provided on the exterior surface of the cylindrical body member of the second connector element and the bearing surface is provided on the interior surface of the second cylindrical body member of the second connector element, the bearing surface being curved towards the central axis.

The seal seat may be provided by the second connector element and the seal arranged to provide a spherical seal surface and the bearing surface provided by the first connector element and is substantially cylindrical, the spherical seal surface being arranged so as to maintain sealing engagement with the cylindrical bearing surface within a predetermined range of relative rotation between the first and second connector elements in the planes parallel to the central axes.

One or more further bearing surfaces and one or more corresponding seals may be provided concentrically for the interconnection of a multiple walled pipe. One of the connector elements may exclusively comprise the corresponding seals and the other the connector element may exclusively comprise the bearing surfaces. One of the connector elements may comprise one of the corresponding seals and one of the bearing surfaces and the other connector element may comprise a corresponding respective bearing surface and corresponding seal.

One or more connector elements may be terminal connectors. The connector may be provided for connecting a fuel pipe. The fuel pipe may be for an aircraft. The connector may further comprise retaining means for maintaining the engagement of the connector elements.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
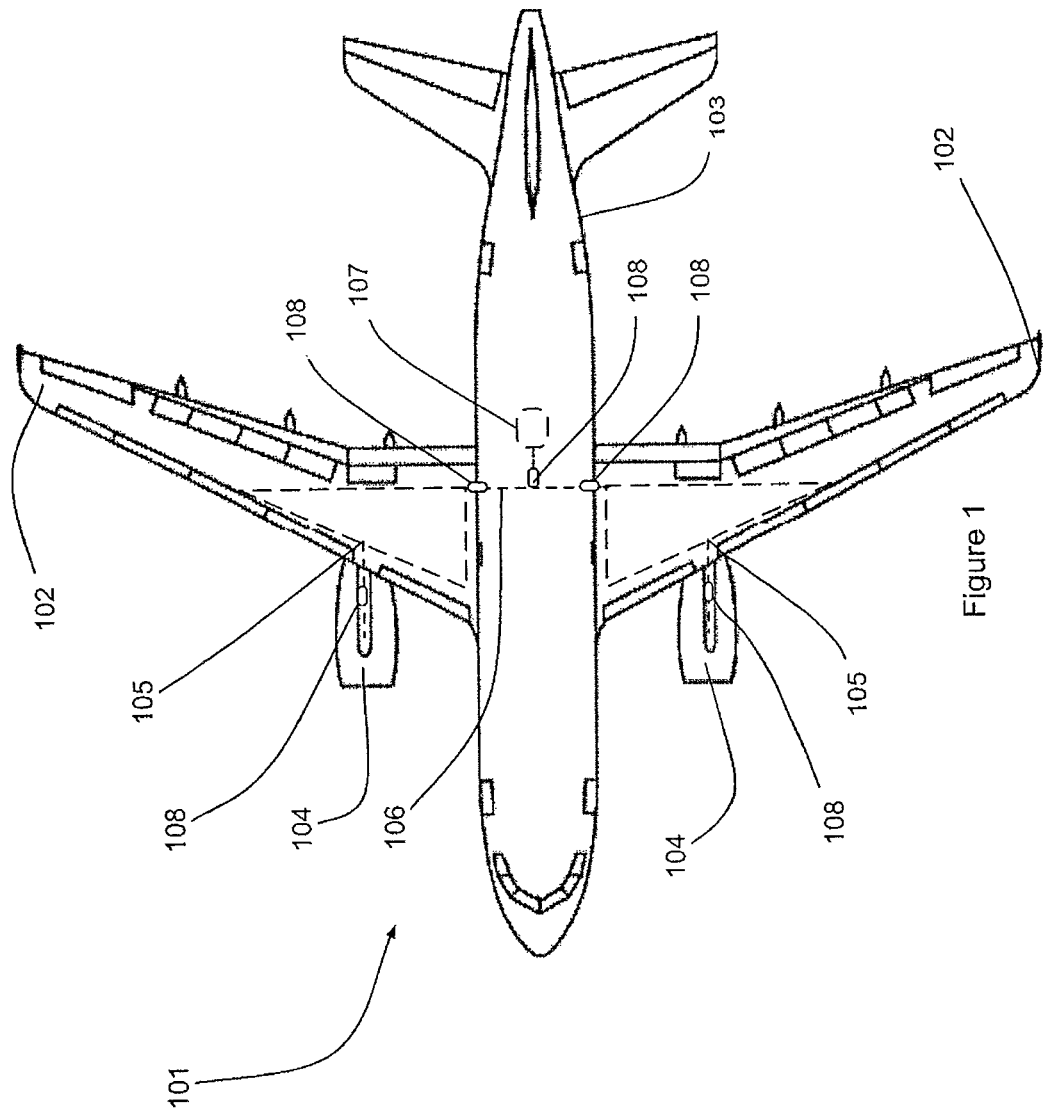
FIG. 1 is an illustration of an aircraft in plan view.

With reference to FIG. 1, an aircraft 101 comprises a pair of wings 102 faired into a fuselage 103. Each wing 102 carries an engine 104 and an internally located fuel tank 105. The fuel tanks 105 are connected to the engines 104 by a set of fuel lines or pipes 106. The supply of fuel from the fuel tanks 105 to the engines 104 is controlled by a fuel delivery control system 107. The fuel pipes 106 are constructed from a series of lengths of pipes jointed using pipe connectors 108. Each pipe connector 108 comprises a female pipe connector element and a male pipe connector element.

Figure 2A:
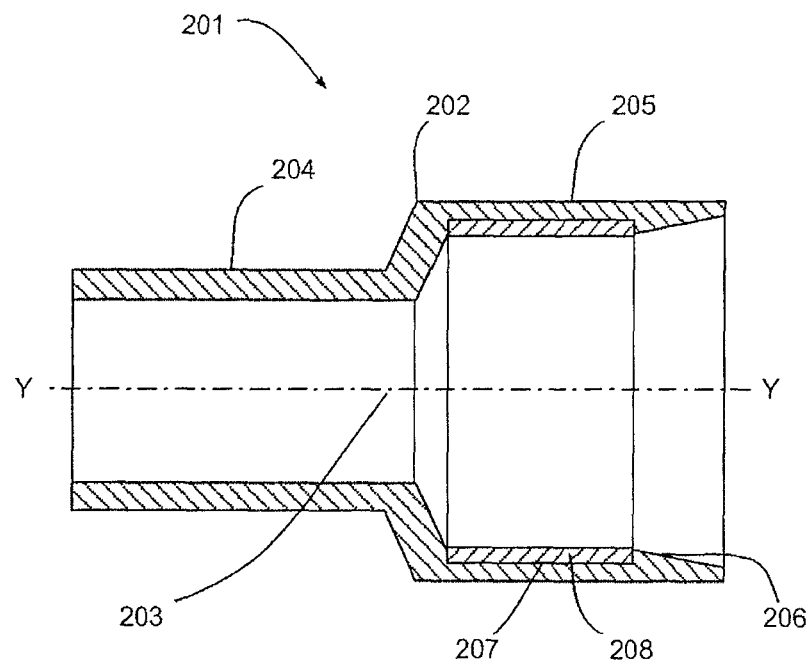
FIG. 2a is a cross sectional views of a female pipe connector element used in the aircraft of FIG. 1.

With reference to FIG. 2a, the female pipe connector element 201 comprises generally cylindrical hollow body member 202 having a central axis Y and providing an internal space 203 for fuel flow. The body member 202 comprises connection means 204, in the form of a cylindrical spigot, formed at one end, for connecting to a pipe 106. The body member 202 further comprises a cylindrical socket 205 formed at the end opposite to the spigot 204. The socket 205 has an internally linearly tapered opening 206 that is tapered inwardly towards the central axis Y. The internal surface of the socket 205 is recessed to provide a cylindrical seal sear 207. A cylindrical seal 208 retained within the female connector element 201 by being seated within the seal seat 207. The seal 208 has a cylindrical internal surface providing a sealing surface parallel to the central axis Y.

Figure 2B:
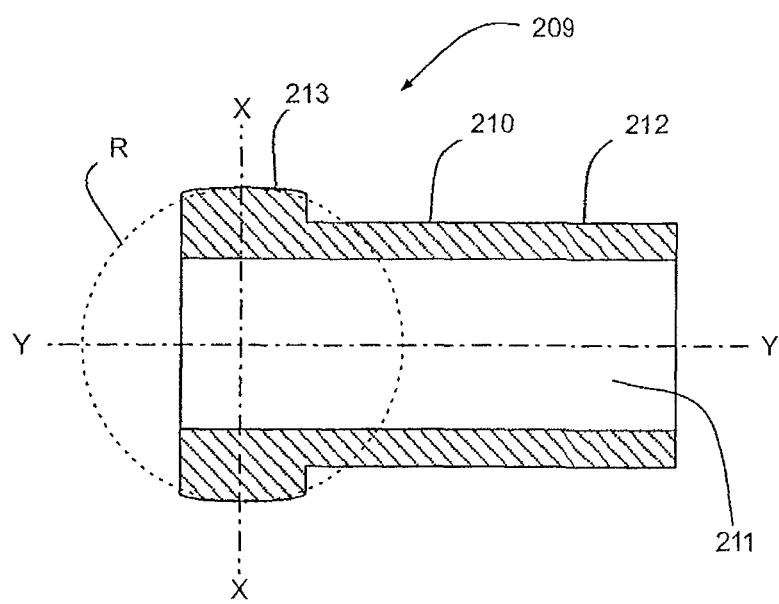
FIG. 2b is a cross sectional views of a male pipe connector element used in the aircraft of FIG. 1.

With reference to FIG. 2b, the male pipe connector element 209 comprises a generally hollow body member 210 providing an internal space 211 for fluid flow. The body member 202 comprises connection means 212, in the form of a cylindrical spigot, formed at one end for connecting to a pipe 106. The body member further comprises a cylindrical bearing surface 213 formed on its outer surface at the end opposite to the spigot 212. The bearing surface 213 is circular in a first plane X perpendicular to the central axis Y of the cylindrical body member 210. The bearing surface 213 is also circular in a second plane R coincident and parallel to the central axis Y of the cylindrical body member 210. In other words, the bearing surface 213 is spherical about the central axis Y of the cylindrical body member 210.

Figure 3A:
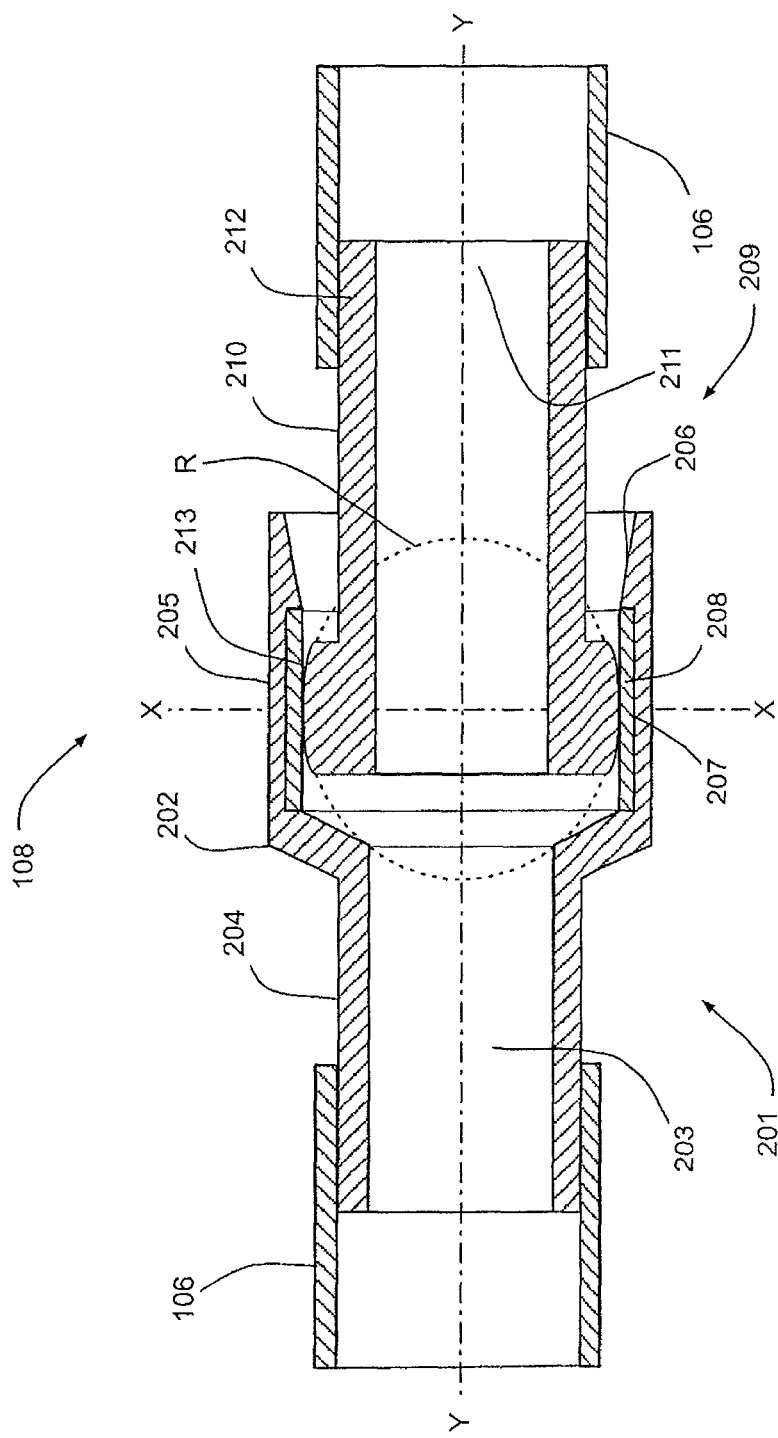
FIG. 3a is a cross sectional view of the female pipe connector element of FIG. 2a in operational engagement with the male pipe connector element of FIG. 2b.
Figure 3B:
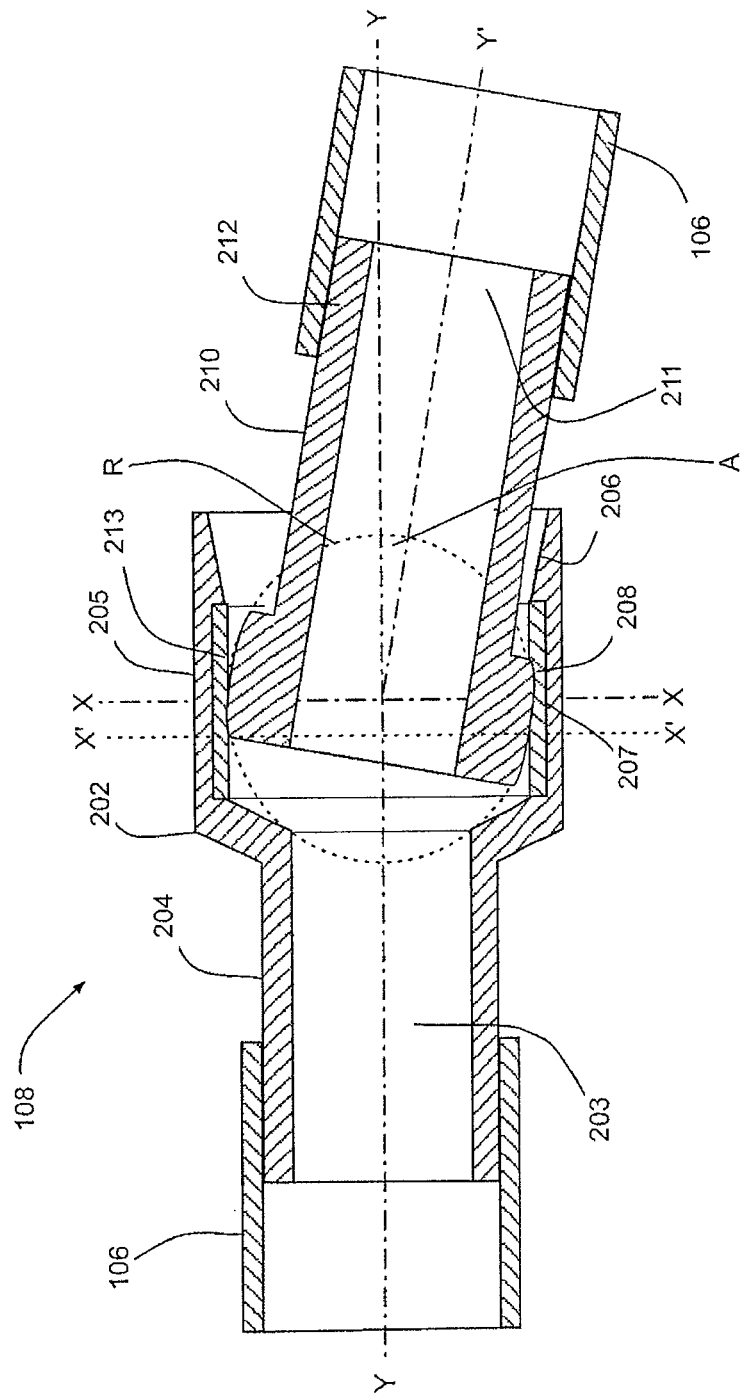
FIG. 3b is a cross sectional view of the pipe connector of FIG. 3a illustrating relative movement of the pipe connector elements.

FIG. 3a shows the female and male connector elements 201, 209 interconnected and attached to respective pipes 106. The radius of the bearing surface 213 in the first plane X is selected to enable the male connector element 209 to be inserted into the socket 205. The radius of the bearing surface in the first plane X is further selected to provide a fluid-tight fit between the bearing surface 213 and the internal surface of the seal 208 once the female and male connector elements 201, 209 have been interconnected as shown in FIG. 3a. Furthermore, as shown in FIG. 3b, the circular form of the bearing surface 213 in the second plane R enables the relative rotation of the axes of the female and male connector elements 201, 209 while maintaining the fluid-tight fit between the bearing surface 213 and the internal surface of the seal 208. In the example shown in FIG. 3b, the axis Y' of the male connector element has rotated relative to the axis Y of the female connector element by an angle A. The internal taper 206 of the socket 205 is arranged to accommodate the relative rotation A of the body member 210 as shown in FIG. 3b. In addition, the internal taper 206 of the socket 205 is arranged to assist in the insertion of the male connector element 201 into operational engagement with the female connector element 209. In the present embodiment, the possible angle of rotation A is arranged to be greater than 2° and up to 10°. In addition to the relative rotation A, the bearing surface 213 also enables the relative movement of the male and female connector elements 201, 209 along their respective central axes Y', Y while maintaining the fluid-tight fit between the bearing surface 213 and the internal surface of the seal 208. For example, as shown in FIG. 3b, the male connector element 201 may shift along its central axis Y' so as to move the first plane X to a second position indicated in FIG. 3b as the plane X'.

Figure 4:
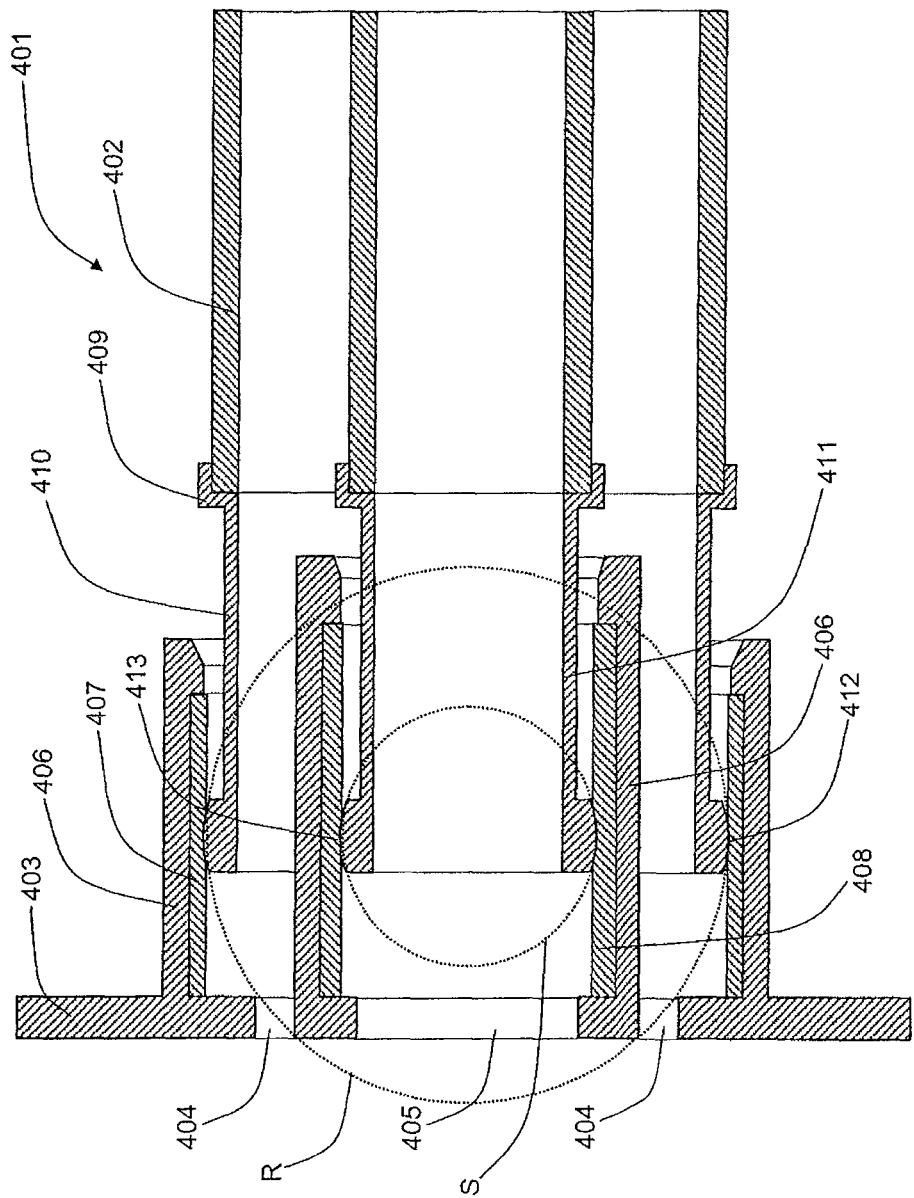
FIG. 4 is a cross sectional view of another embodiment of a pipe connector.

With reference to FIG. 4, in another embodiment, a pipe connector 401 is arranged to connect a double walled pipe 402 to a terminal connector element 403. The terminal connector element 403 is arranged with ports 404, 405 to connect respective flows within the pipe 402 to a terminal such as the fuel system for an engine 104 or to a fuel tank 105. The terminal connector element 403 provides two concentric female sub-elements 406 each carrying respective seals 407, 408 formed as described above with reference to FIG. 2a. A male pipe connector element 409 comprises two concentric male sub-elements 410, 411 each corresponding to one wall of the double walled pipe 402 and each formed with respective bearing surfaces 412, 413 formed as described above with reference to FIG. 2b. The bearing surfaces 412, 413 are circular in their respective planes R, S so as to enable relative rotation of the axes of the connector elements 403, 409 while maintaining the fluid-tight fit between the bearing surfaces 412, 413 and the internal surfaces of the respective seals 407, 408. In addition to the relative rotation of the connector elements 403, 409, the bearing surface 412, 413 also enable the relative movement of the male and female connector elements 403, 409 along their respective central axes Y while maintaining the fluid-tight fit between the bearing surfaces 412, 413 and the internal surface of their respective seals 407, 408. The female and male sub-elements 406, 410, 411 are thus arranged so as to maintain a fluid-tight seal for the two flows and the exterior of the double walled pipe 402.

Figure 5:
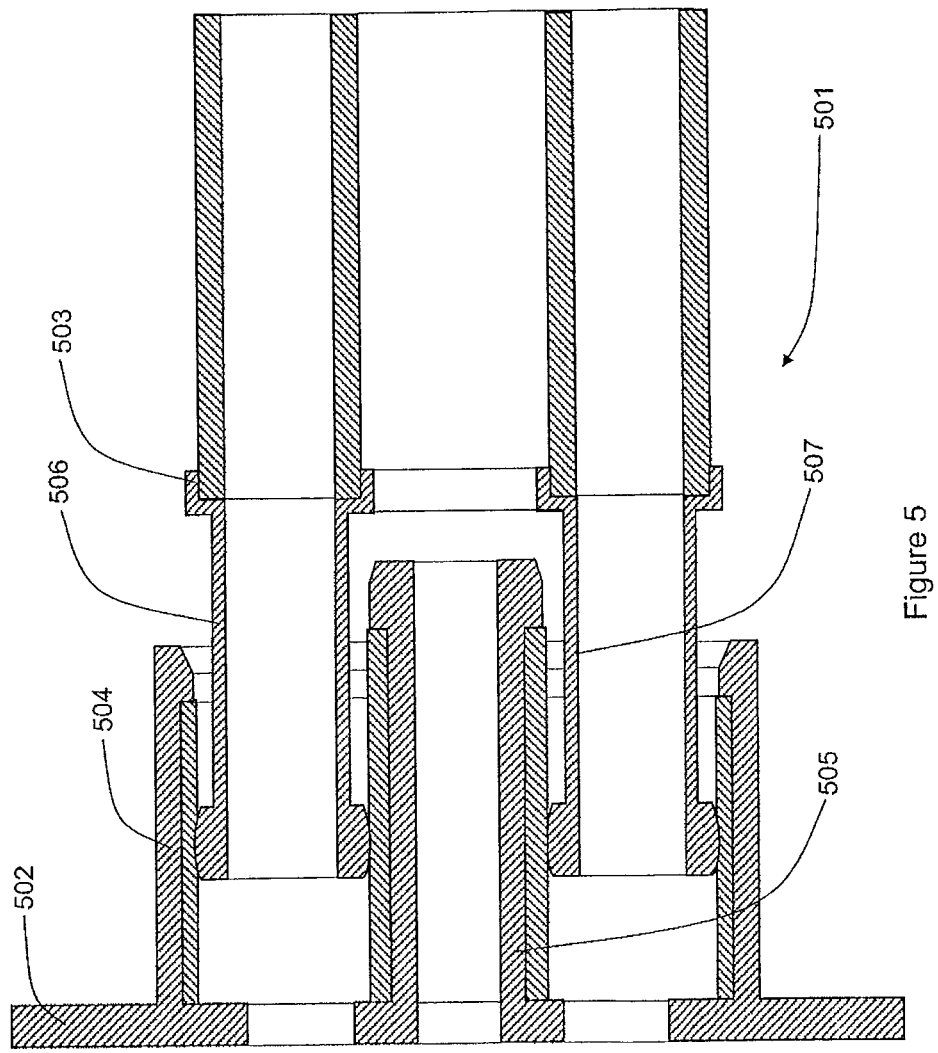
FIG. 5 is a cross sectional view of a further embodiment of a pipe connector.

With reference to FIG. 5, in another embodiment, a pipe connector 501 comprises a terminal connector element 502 and a pipe connector element 503. In this embodiment, the terminal connector element 502 comprises an outer female connector sub-element 504 and a concentric internal male connector sub-element 505. The pipe connector element comprises a corresponding outer male connector sub-element 506 and a concentric internal female connector sub-element 507.

In another embodiment, the pipe connector is provided with retaining means for maintaining its two elements in operational engagement. The internal tapered surface of the socket may be extended inwardly so as to form a lip, which requires a predetermined force to be applied to enable the insertion of the male connector element into operational engagement with the female connector element. In other words, the pipe connector may be provided with retaining means in the form of a snap-fit arrangement for maintaining operational engagement. The retaining means may be in the form of a cap, ring, clip, spring, collet or elastic of shrink-fit sheath.

In a further embodiment, the one of the connector elements is provided with one or more radially extending flanges for providing one or more fixing points for fixing the connector element to a suitable securing structure. The flanges may be fix to the suitable securing structure by any suitable means such as rivets, clips, welding or bonding.

In another embodiment, the seal seat is open-sided, that is, the seal seat is not recessed into the inner surface of the female connector element. In this arrangement, the seal may be bonded or otherwise secured within the female connector element.

In a further embodiment, the seal is provided with a groove in its internal sealing surface to provide for positive location of the bearing surface of the male connector element while still providing a fluid-tight seal. The groove may be spherical.

In another embodiment, the seal is formed from and electrically conductive material so as to provide electrical bonding between the male and female connector elements. Such a seal may be formed from an elastomer with suitable carbon impregnation.

As will be understood by those skilled in the art, the spherical nature of the bearing surface may be arranged so as to provide a degree of relative axial rotation of respective male and female connector elements.

As will be understood by those skilled in the art, the seals may be formed from any suitable material for a given application. The seals may be formed separately or integrally with the female connector members and may be bonded or over-moulded. Furthermore, the pipe connectors may be formed by moulding or machining of any suitable material such as metal or plastics depending on the given application. The seal(s) may be integrally formed of the same material. The connector elements may be integrally formed at respective ends of a length of pipe.

As will be understood by those skilled in the art, the ranges of both rotational and axial movement relative movement of the connector elements described above may be shifted, increased or decreased in accordance with a given application for the pipe connector.

As will be understood by those skilled in the art, while embodiments above are described in relation to aircraft and aircraft fuel, embodiments of the invention may be provided for any other suitable application and for use for connecting terminals or pipes for carrying any suitable fluid. The term fluid includes liquid or gas. Thus, in some embodiments, the pipe connector may be used in system carrying gas such as nitrogen enriched air (NEA) for use in fuel tank inerting systems.

As will be understood by those skilled in the art, while the embodiment above are described in relation to the straight connection of common diameter pipes, embodiments may also be provided for tee or elbow connections and for connecting pipes of different diameter, that is, providing diameter reduction/expansion connectors. Furthermore, while the pipes and connectors described above have generally circular cross sections, other embodiments may be provided with other suitable sections such as ovoid, rhomboid or triangular. Also while the radius of curvature of the bearing surfaces in the embodiments described above are circular, embodiments may be provided with other types of curvature. Different types of curvature may provide different sealing properties and may enable a given embodiment of the pipe connector to deal with a particular type of relative movement between its elements.

As described above, the bearing surfaces may be provided by a female connector element in which case the bearing surfaces curve towards the central axis of the given connector element. Conversely, when the bearing surfaces are provided by a male connector element, the bearing surface will curve away from the central axis of the given connector element.

In another embodiment, the seal seat is provided in the exterior surface of the male pipe connector element and the seal is arranged to sit within the seat and to provide a spherical exterior seal surface. The bearing surface is substantially cylindrical and provided by the interior surface of the female pipe connector element. Thus, the spherical seal surface is arranged so as to maintain sealing engagement with the cylindrical bearing surface within a predetermined range of relative rotation between the first and second connector elements in the planes parallel to the central axes. As will be understood by those skilled in the art, the seal seat may comprise a spherical seat surface to which the seal conforms so as to form the spherical seal surface. Alternatively, the spherical seal surface may be mould into the seal itself and thus substantially independent of the shape of the seal seat. For example, the seal seat may by substantially cylindrical.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A pipe connector, comprising:
   a first connector element comprising a generally cylindrical body member having a central axis and providing a connection for a pipe at one end, said first connector element having a first female sub-element including a first opening and a second opening defining a first passageway therebetween, and a concentric second female sub-element including a third opening and a fourth opening defining a second passageway therebetween;
   a terminal connector attached to said first female sub-element for connecting said first connector element to a terminal, wherein said terminal connector includes a first port and a concentric second port;
   a first seal seat recessed within an inner surface of said first female sub-element;
   a second seal seat recessed within an inner surface of said concentric second female sub-element;
   a first seal retained within said first seal seat;
   a second seal retained within said second seal seat;
   a second connector element comprising a generally cylindrical body member having a central axis and providing a connection for a pipe at one end and connection to said first connector element at a second end,
   said second connector element having first male sub-element and a concentric second male sub-element each having a bearing surface being radially disposed and configured such that said second connector concentric male sub-element bearing surface maintains sealing engagement with said second seal within a predetermined range of relative movement of the first and second connector elements, and said second connector first male sub-element bearing surface maintains sealing engagement with said first seal within said predetermined range of relative movement, wherein said predetermined range of relative movement comprises relative movement longitudinally along said central axis, wherein said predetermined range of relative movement also comprises relative rotation about said central axis and in planes parallel with said central axis, and wherein a first fluid flow path exists within said first female sub-element through said first passageway, and a second separate fluid flow path exists within said concentric second female sub-element through said second passageway.

2. A connector according to claim 1 in which said first seal is electrically conductive.

3. A connector according to claim 1 in which one or more connector elements are terminal connectors.

4. A connector according to claim 1 for connecting a fuel pipe.

5. A connector according to claim 1 further comprising retaining means for maintaining the engagement of said connector elements.

6. A connector according to claim 1, wherein said seals provide cylindrical sealing surfaces for said sealing engagement with said bearing surfaces.

7. A connector according to claim 1, wherein said first seal is provided on the interior surface of said first female sub-element and said bearing surface is provided on the exterior surface of the first male connector sub-element, said bearing surface being curved away from said central axis.

8. A connector according to claim 1, wherein said second seal is provided on the interior surface of said concentric second female sub-element and said bearing surface is provided on the exterior surface of the second concentric male connector sub-element, said bearing surface being curved away from said central axis.

9. An aircraft fuel pipe connector for connecting to a fuel pipe in an aircraft, comprising:
- a first connector element comprising a generally cylindrical body member having a central axis and providing a connection for a pipe at one end, said first connector element having a first female sub-element including a first opening and a second opening defining a first passageway therebetween, and a concentric second female sub-element including a third opening and a fourth opening defining a second passageway therebetween;
- a first seal seat recessed within an inner surface of said first female sub-element;
- a second seal seat recessed within an inner surface of said concentric second female sub-element;
- a first seal retained within said first seal seat;
- a second seal retained within said second seal seat;
- a second connector element comprising a generally cylindrical body member having a central axis and providing a connection for a pipe at one end and connection to said first connector element at a second end,
- said second connector element having first male sub-element and a concentric second male sub-element each having a bearing surface being radially disposed and configured such that said second connector concentric male sub-element bearing surface maintains sealing engagement with said second seal within a predetermined range of relative movement of the first and second connector elements, and said second connector first male sub-element bearing surface maintains sealing engagement with said first seal within said predetermined range of relative movement, wherein said predetermined range of relative movement comprises relative movement longitudinally along said central axis, wherein said predetermined range of relative movement also comprises relative rotation about said central axis and in planes parallel with said central axis, and wherein a first fluid flow path exists within said first female sub-element through said first passageway, and a second separate fluid flow path exists within said concentric second female sub-element through said second passageway.

* * * * *